United States Patent

Sato et al.

[15] 3,645,467

[45] Feb. 29, 1972

[54] SPOOL FOR CAMERAS

[72] Inventors: Akihiko Sato, Tokyo; Minoru Takahashi, Yokohama-shi, both of Japan

[73] Assignee: Nippon Kogaku K. K., Tokyo, Japan

[22] Filed: Dec. 16, 1969

[21] Appl. No.: 885,590

[30] Foreign Application Priority Data

Dec. 25, 1968 Japan.................................43/113220

[52] U.S. Cl..............................................................242/74.2
[51] Int. Cl.......................................................B65h 75/28
[58] Field of Search...................242/71, 71.1, 71.2, 74, 74.1, 242/71.6, 74.2

[56] References Cited

UNITED STATES PATENTS 2,487,479   11/1949   Roehrl................................242/74.1 X Primary Examiner—George F. Mautz
Assistant Examiner—Gregory A. Walters
Attorney—Ward, McElhannon, Brooks & Fitzpatrick

[57] ABSTRACT

A spool which can automatically take up a film only by inserting the leading end portion thereof into a film insertion slot of the spool is provided. The spool comprises rotatable outer and inner cylinders, the former having insertion slots while the latter, pawls for engagement with perforations of film and positioned normally in nonalignment with the insertion slots by means of a spring. Upon insertion, the film moves along the inner surface of the outer cylinder and its perforation automatically engages with the pawl, thereby securely holding the film. Upon rewinding of the film, the pawls disengage from the perforations since the outer cylinder is held stationary by the film while the inner cylinder rotates.

4 Claims, 9 Drawing Figures

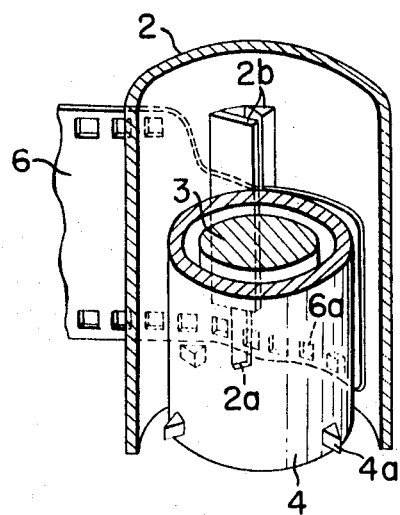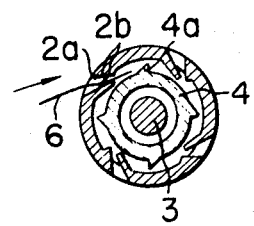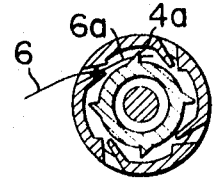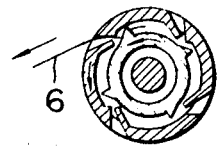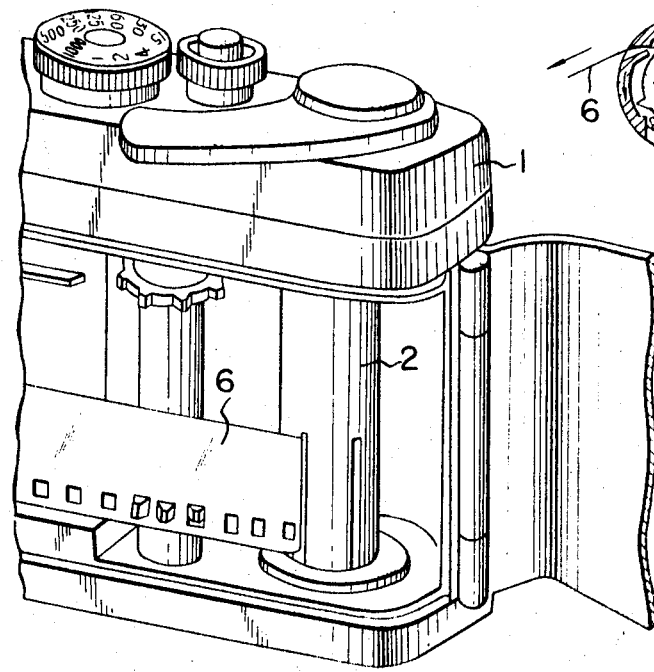

SPOOL FOR CAMERAS

The present invention relates to a film spool adapted to be mounted in cameras.

In the conventional film spool, as the film is not securely held by the spool when the film is inserted into a film clip slot of the spool the film tends to be released from the spool because of curling of the film. Therefore, even when the film advance lever is operated, the film is not wound or advanced, and an operator must make efforts so as to securely hold the film around the spool.

In view of the above, the primary object of the present invention is to eliminate such defect and difficulty as described above and to provide a spool on which the film can be securely held only by inserting the leading end of the film into the slot of the spool.

In brief, one form of a spool in accordance with the present invention comprises relatively rotatable outer and inner cylinders. The outer cylinder has a plurality of film insertion openings or slots while the inner cylinder has pawls whose number is the same as that of the insertion openings or slots and which are arranged so as to oppose the insertion openings or slots respectively. Upon insertion of the leading end of the film, it moves along the inner surface of the outer cylinder and its perforation automatically engages with one of the pawls so that the film may be securely held by the spool. The film may be released from the spool since the outer cylinder is held stationary by the film leader portion as the film is rewound while the inner cylinder rotates thereby to disengage the pawl from the perforation.

The above and other objects, features and advantages of the present invention will become more apparent from the following description of one illustrative embodiment thereof with reference to the accompanying drawing.

FIG. 5 is a fragmentary vertical sectional view;

FIGS. 6, 7 and 8 are for explanation of the operation, FIG. 6 illustrating the film being inserted; FIG. 7 the film held in position; and FIG. 8, the film being rewound; and FIG. 9 is a perspective view illustrating the spool of the present invention attached to a camera.

Figure 1:
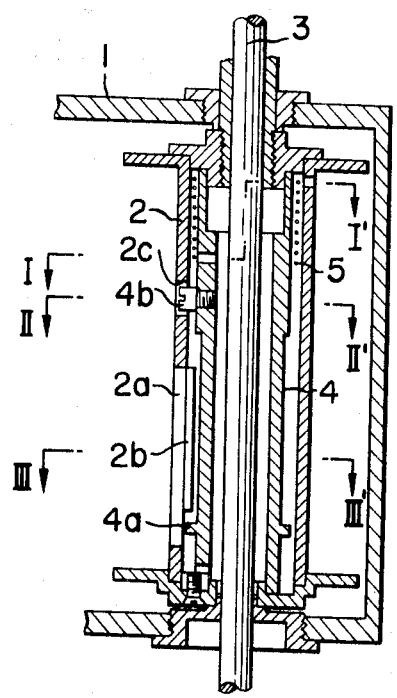
FIG. 1 is a vertical sectional view of one embodiment of the present invention.

Reference numeral 1 designates a camera body; and 2 an outer cylinder loosely fitted over an inner cylinder 4 and rotatable relative thereto and a film winding shaft 3. The outer cylinder 2 is provided with a plurality of film insertion openings 2a and a film insertion guide member 2b slantly inwardly extending along the film insertion opening 2a, the width (in the axial direction of the outer cylinder) of the film guide member 2b being slightly shorter than that of the film insertion opening 2a. The outer cylinder 2 is further provided with an opening 2c which is adapted to limit the rotation thereof. The inner cylinder 4 is fitted over the film winding shaft 3 so that frictional force may act therebetween in the manner well known in the art. As shown in FIG. 5, along the outer periphery of the inner cylinder 4 in opposed relation with the film insertion openings 2a are provided pawls 4a for engagement with perforations of the film 6. The number of the pawls 4a are the same as that of the film insertion openings 2a. It should be noted that these pawls 4a are arranged so as not to interfere with the film insertion guide members 2b. In other words, these pawls 4a are arranged opposite to the portions of the film insertion openings 2a having no film guide members 2b.

Figure 2:
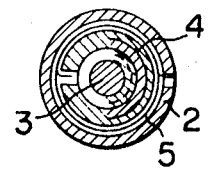
FIGS. 2 to 4 are cross-sectional views taken along the lines 1—1', II—II' and III—III' of FIG. 1, respectively.
Figure 3:
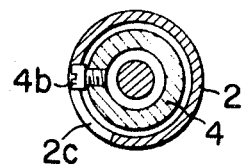
Figure 4:
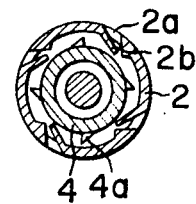

A pin 4b extending from the inner cylinder 4 is fitted into the opening 2c of the outer cylinder 2 so that the angle of rotation of the outer cylinder 2 is limited within the dimension of the opening 2c. One end of a spring 5 is fitted to the outer cylinder 2 while the other end to the inner cylinder 4 so that the inner cylinder is normally biased to rotate in the clockwise direction, and the opening 2c, the pin 4b and the spring 5 are so arranged that the outer cylinder 2 may be positioned normally relative to the inner cylinder 4 as shown in FIG. 2 to 4. Thus, it will be seen that one form of the spool in accordance with the present invention is comprised of the parts, elements and members 2 to 2c and 4 to 5 as described above.

Upon insertion of the film 6 into the film insertion opening 2a as shown in FIG. 6, the film 6 enters into the outer cylinder 2 along the film insertion guide 2b and as it moves along the outer periphery of the inner cylinder 4, its leading end is pushed upwardly by one of the pawls 4a so that the perforation 6a engages with the pawl 4a by the elasticity of the film 6 itself as shown in FIG. 5 and 7, whereby the film 6 is securely held in position by the spool.

When it is desired to release the film 6 from the spool, the film 6 is pulled in the direction indicated by the arrow so that the inner cylinder 4 is rotated in the direction indicated by the arrow because of the engagement of the pawls 4a with the film perforations 6a. When the pawl 4a engaged with the perforation 6a comes to the film insertion opening 2a, the pawl 4 is disengaged from the perforation so that the film may be smoothly released from the spool. Concurrently, the outer cylinder 2 is reversed by the spring 5 and then is stopped again by the engagement of the pin 4b with the opening 2c, which limits the angle of rotation of the outer cylinder 2, at the position indicated in FIG. 6.

From the foregoing, it is seen that the film may be securely held by the spool only by inserting the film therein a predetermined length so that the film will never be released from the spool because of curling of the film. Thus, no effort is required to try to manually hold the film around the spool, and anyone can easily and securely have the film held by the spool. Furthermore, the film may be smoothly released from the spool when rewound so that there is no fear of causing any damage to the film.

What is claimed is:

1. A takeup spool for a camera adapted to receive the leading end of a film strip having perforations and to wind the strip thereon which comprises:

an outer cylinder having a plurality of longitudinal slots adapted to receive the film end;

an inner cylinder positioned within said outer cylinder and rotatably connected to the film winding handle of the camera, said inner cylinder having a plurality of pawls underlying said slots for engaging one of the perforations of the strip when the film end is inserted through one of said slots;

a resilient member between said cylinders for causing relative rotational displacement between said slots and said pawls; and means for limiting said relative rotational displacement within a predetermined range, said limiting means adapted to cause said cylinder to rotate as a unit when the inner cylinder is rotated by the handle for winding said strip and to permit said relative rotational movement against said resilient member for pulling out the film end from said slot when the strip is rewound.

2. A takeup spool according to claim 1, wherein said limiting means includes a radial slot on the periphery of said outer cylinder and a pin fixed on said inner cylinder and extending into said radial slot.

3. A takeup spool according to claim 1 wherein said outer cylinder has a plurality of film guiding members projected from the inner surface thereof, each of said film guiding members being adjacent to one of said longitudinal slots, whereby the film end guided by one of said film guiding members is bent by the other one of said film guilding members for engaging the perforation of the strip with one of said pawls.

4. A takeup spool according to claim 1, wherein said resilient member is a torsion spring wound about said inner cylinder and connecting the latter to said outer cylinder.

* * * * *